(12) United States Patent
Maruta

(10) Patent No.: US 10,444,614 B2
(45) Date of Patent: Oct. 15, 2019

(54) REFLECTIVE SCREEN

(71) Applicant: ARISAWA MFG. CO., LTD., Niigata (JP)

(72) Inventor: Hajime Maruta, Niigata (JP)

(73) Assignee: ARISAWA MFG. CO., LTD., Niigata (JP)

(*) Notice: Subject to any disclaimer, the term of this patent is extended or adjusted under 35 U.S.C. 154(b) by 72 days.

(21) Appl. No.: 15/597,576

(22) Filed: May 17, 2017

(65) Prior Publication Data

US 2017/0248839 A1 Aug. 31, 2017

Related U.S. Application Data

(63) Continuation of application No. PCT/JP2014/081481, filed on Nov. 27, 2014.

(51) Int. Cl.
*G03B 21/60* (2014.01)
*G03B 21/58* (2014.01)

(52) U.S. Cl.
CPC .............. *G03B 21/60* (2013.01); *G03B 21/58* (2013.01)

(58) Field of Classification Search
CPC .................................................... G03B 21/60
USPC ........................................................ 359/459
See application file for complete search history.

(56) References Cited

U.S. PATENT DOCUMENTS

| | | | | | |
|---|---|---|---|---|---|
| 6,144,491 | A | * | 11/2000 | Orikasa | G03B 21/60 359/452 |
| 7,262,911 | B2 | * | 8/2007 | Niwa | G03B 21/60 353/70 |
| 7,911,695 | B2 | * | 3/2011 | Maruta | G03B 21/56 359/461 |
| 2007/0002439 | A1 | * | 1/2007 | Sekiguchi | G02B 3/08 359/457 |

(Continued)

FOREIGN PATENT DOCUMENTS

| JP | H06-138549 A | 5/1994 |
|---|---|---|
| JP | H10-287091 A | 10/1998 |

(Continued)

OTHER PUBLICATIONS

International Search Report issued in PCT/JP2014/081481, dated Feb. 24, 2015, with translation (9 pages).

(Continued)

*Primary Examiner* — Christopher E Mahoney
(74) *Attorney, Agent, or Firm* — Nakanishi IP Associates, LLC

(57) ABSTRACT

A screen with a high flatness where no distortion arises in a central portion of the screen can be obtained. A first thickness of a portion other than a plurality of inclined portions that reflects to the front a obliquely-incident projection light is no more than 2 times a second thickness of the inclined portion. Moreover, a width is about 1550 mm, a height is about 900 mm, and when the reflective screen is suspended so a vertically-downward pulling load is about 3 kg, in a first region that includes the central portion of the reflective (Continued)

screen but does not include an end portion of the reflective screen, no shift arises in an image displayed on the reflective screen between when a reference line passing through a substantially central portion of the reflective screen at an incidence angle of about 15 degrees and when the reference line is projected at an incidence angle of about 60 degrees.

9 Claims, 11 Drawing Sheets

(56) References Cited

U.S. PATENT DOCUMENTS

| | | | |
|---|---|---|---|
| 2009/0141348 A1 | 6/2009 | Maruta et al. | |
| 2012/0154908 A1 | 6/2012 | Kitabayashi | |
| 2014/0293414 A1 | 10/2014 | Maruta et al. | |
| 2016/0334697 A1* | 11/2016 | Kim | G03B 21/60 |

FOREIGN PATENT DOCUMENTS

| | | |
|---|---|---|
| JP | 2006-23693 A | 1/2006 |
| JP | 2006-133462 A | 5/2006 |
| JP | 2008-76524 A | 4/2008 |
| JP | 2008-122881 A | 5/2008 |
| JP | 2009-134189 A | 6/2009 |
| JP | 2009-223104 A | 10/2009 |
| JP | 2012-128137 A | 7/2012 |
| JP | 2012-252228 A | 12/2012 |
| JP | 2014-182351 A | 9/2014 |
| JP | 2014-199380 A | 10/2014 |
| WO | 2013/038461 A1 | 3/2013 |
| WO | 2013/088471 A1 | 6/2013 |

OTHER PUBLICATIONS

Written Opinion of International Searching Authority issued in PCT/JP2014/081481, dated Feb. 24, 2015 (8 pages).

Office Action issued in Japanese Patent Application No. 2016-561175 dated Apr. 3, 2018 with English Translation (9 pages).

Office Action issued in Japanese Patent Application No. 2016-561175 dated Aug. 7, 2018 with English Translation (9 pages).

* cited by examiner

REFLECTIVE SCREEN

CROSS-REFERENCE TO RELATED APPLICATIONS

This application is a continuation application of International Patent Application No. PCT/JP2014/081481 filed on Nov. 27, 2014, the entire contents of which are incorporated by reference.

TECHNICAL FIELD

The present invention relates to a reflective screen.

BACKGROUND ART

Patent Literature 1 discloses a reflective screen that reflects, to the front, a light of a projector projected obliquely, provided with: a substrate forming a sawtooth shape by a projection-side inclined surface, which include a material that absorbs light and is provided at an orientation, wherein the light from the projector is incident, and a non-projection-side inclined surface, which is provided at an orientation wherein the light from the projector is not incident, being disposed repeating in alternation, a white resin layer formed on the projection-side inclined surface of the substrate and reflects light; and a transparent diffusion layer that includes a transparent binder resin and a diffusing agent and is formed covering the white resin layer; wherein a roughening treatment is applied to the white resin layer and the non-projection-side inclined surface, the white resin layer reflects to the front the light of the projector, the non-projection-side inclined surface absorbs a majority of external light, and the transparent diffusion layer diffuses the light reflected by the white resin layer and the non-projection-side inclined surface.

CITATION LIST

Patent Literature

Patent Literature 1: Japanese Unexamined Patent Application Publication No. 2006-23693A The invention according to Patent Literature 1 has an issue where, because a tension applied on a screen material when unwinding the screen is uneven, distortion arises in a screen surface, worsening a flatness and distorting a video when projected. In particular, when using a short-focus projector, because an incidence angle to the screen is large, the distortion of the video is significantly visible due to the distortion arising in the screen surface.

The present invention is made in view of the above circumstances.

In one or more embodiments of the present invention, a reflective screen of a sheet shape is provided with a first surface formed with a plurality of inclined portions that reflects to the front an obliquely-incident projection light, wherein a thickness $t_1$ of a portion other than the inclined portion is no more than 2 times a thickness $t_2$ of the inclined portion.

According to one or more embodiments of the present invention, a screen with a high flatness can be obtained.

DESCRIPTION OF EMBODIMENTS

First, a principle whereby distortion of a video becomes significantly visible due to distortion arising in a reflective screen surface when projecting the video to the reflective screen using a short-focus projector is described.

Figure 12:
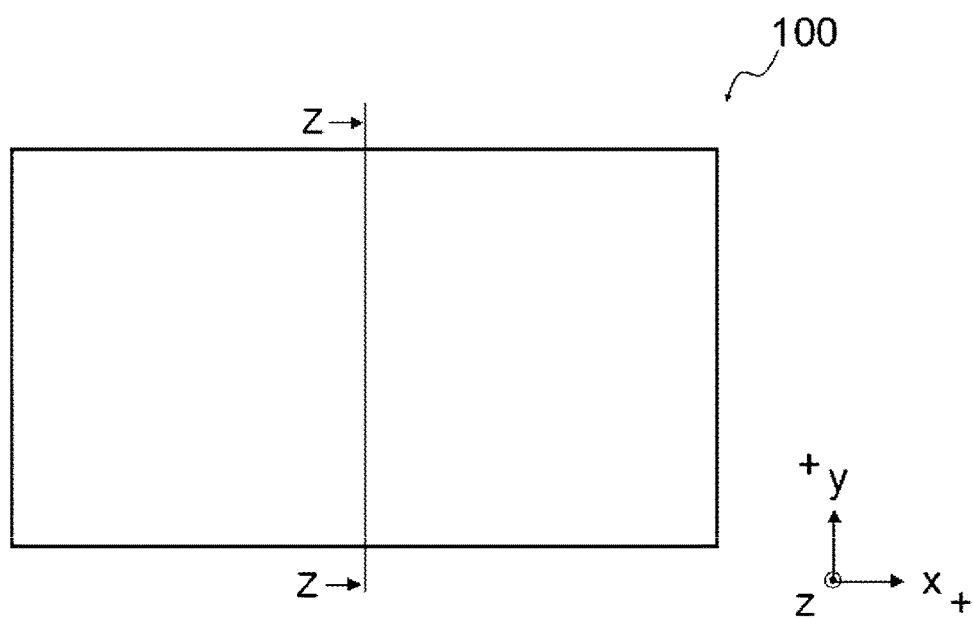
FIG. 12 is a diagram illustrating an overview of a conventional reflective screen.
Figure 13:
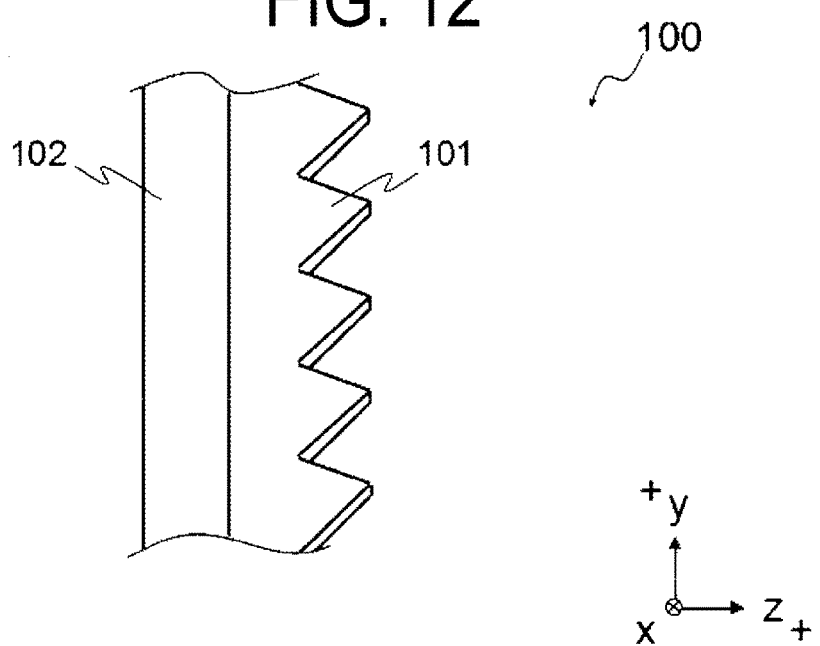
FIG. 13 is a Z-Z cross-sectional view of FIG. 12.

A substantially rectangular reflective screen 100 such as that illustrated in FIGS. 12 and 13 is prepared. FIG. 13 is a Z-Z cross-sectional view of FIG. 12. The screen 100 is a member of a sheet shape having a sheet 101, which is formed with a prism of a sawtooth shape, and a substrate 102, which is provided on a reverse surface of the sheet 101. The sheet 101 is, for example, a urethane-resin sheet, and the substrate 102 is, for example, a PET film.

Figure 14:
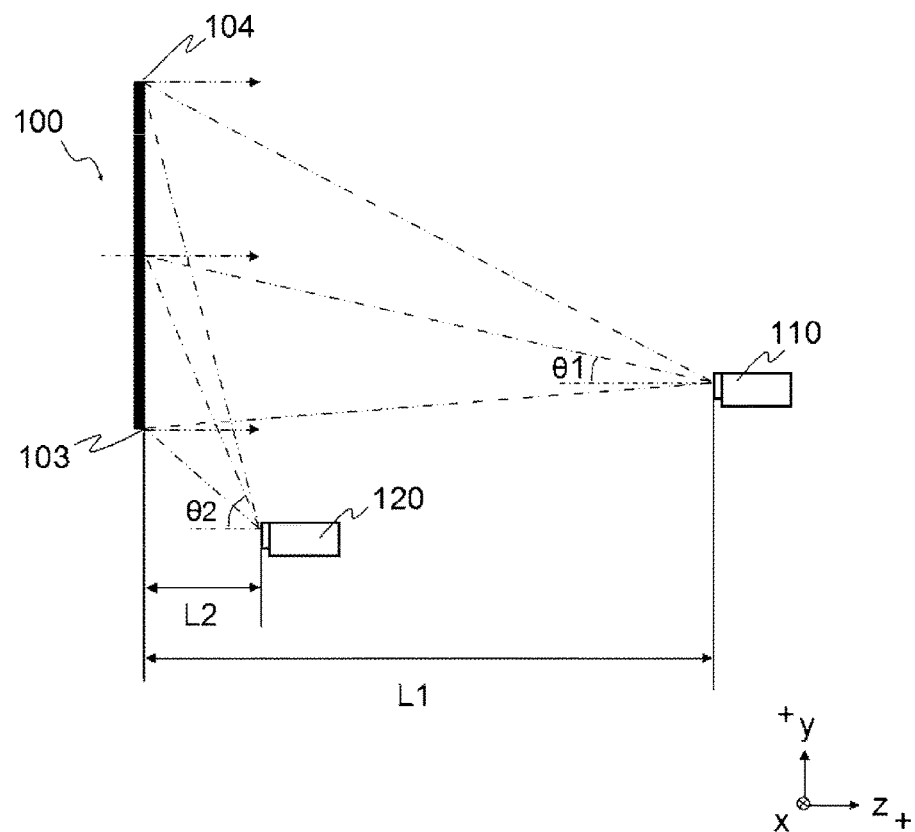
FIG. 14 is a diagram illustrating cases of projecting a video to the conventional reflective screen using the long-focus projector and projecting the video to the conventional reflective screen using the short-focus projector.

FIG. 14 illustrates when projecting a video to the reflective screen 100 using a projector 110 of a normal focal length (referred to as "long-focus projector 110" hereinbelow) and when projecting the video to the reflective screen 100 using a short-focus projector 120. As illustrated in FIG. 14, the reflective screen is disposed so that the sheet 101 is in a substantially vertical direction, and the video is projected to the sheet 101 from the front using the projector. The sheet 101 is provided on a side whereon a light from the short-focus projector 120 is incident, and the substrate 102 is provided on an opposite side of the sheet 101.

The long-focus projector 110 is disposed in front of the reflective screen 100 so that a distance L1 to the reflective screen 100 is about 2500 mm and a projection angle θ1 is about 15 degrees. Moreover, the short-focus projector 120 is disposed in front of the reflective screen 100 so that a distance L2 to the reflective screen 100 is about 250 mm and a projection angle θ2 is about 60 to 70 degrees.

Figure 15:
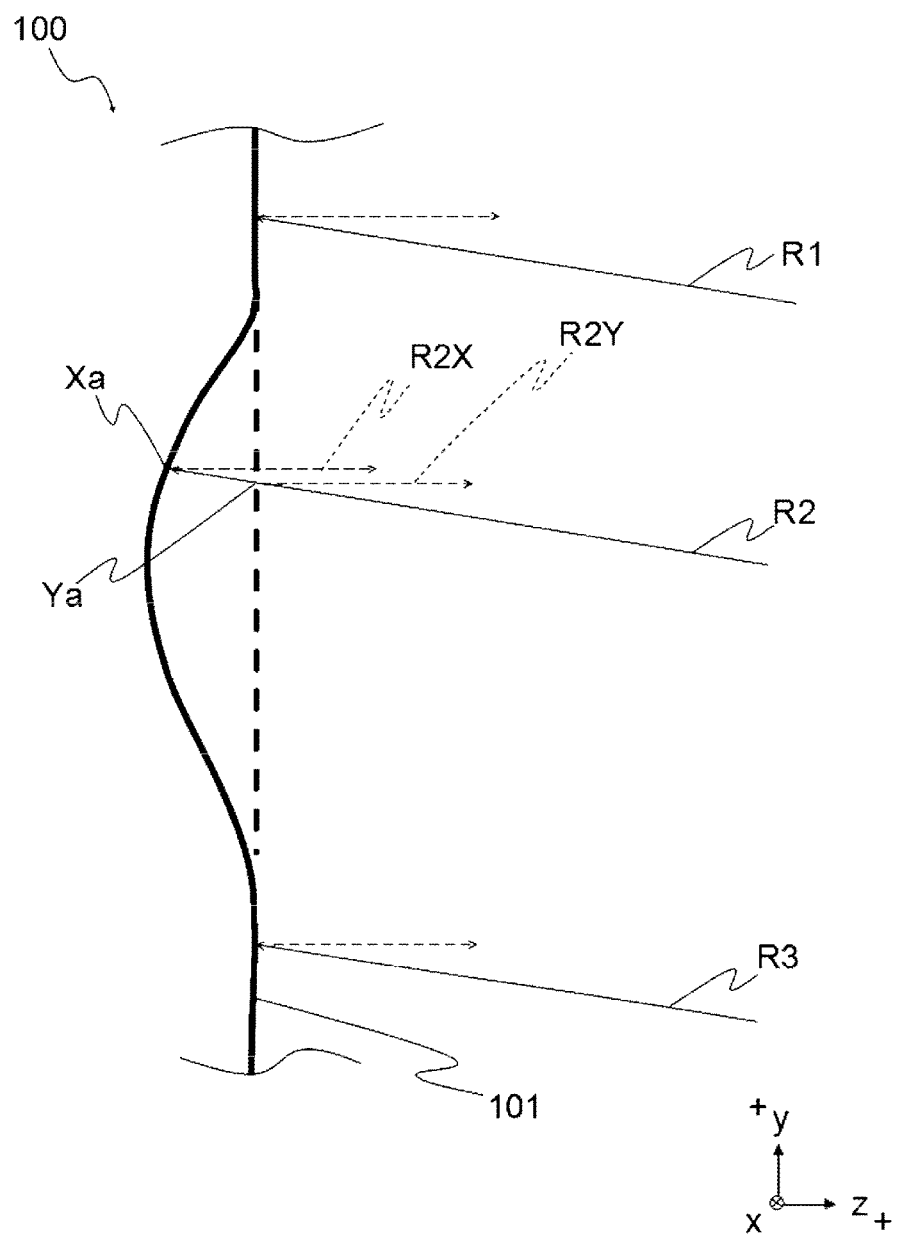
FIG. 15 is a schematic diagram illustrating how a light projected from the long-focus projector is reflected when the conventional reflective screen is recessed.

FIG. 15 is a schematic diagram illustrating how a light projected from the long-focus projector 110 is reflected when the sheet 101 is recessed (where the reflective screen 100 protrudes to an opposite side of a side whereon the long-focus projector 110 is provided).

Projection lights R1, R2, and R3 are irradiated from the long-focus projector 110, reflect at the sheet 101 (see the solid-line arrows in FIG. 15), and are reflected forward (see the dotted-line arrows in FIG. 15). The projection light R2 is reflected at a point Xa on the recessed portion of the sheet 101 as a reflected light R2X. However, because the projection angle θ1 from the long-focus projector 110 is small, at about 15 degrees, a shift in a y direction between a reflected light R2Y reflected at a point Ya on the sheet 101 when the reflective screen 100 is not distorted and the reflected light R2X is small.

Figure 16:
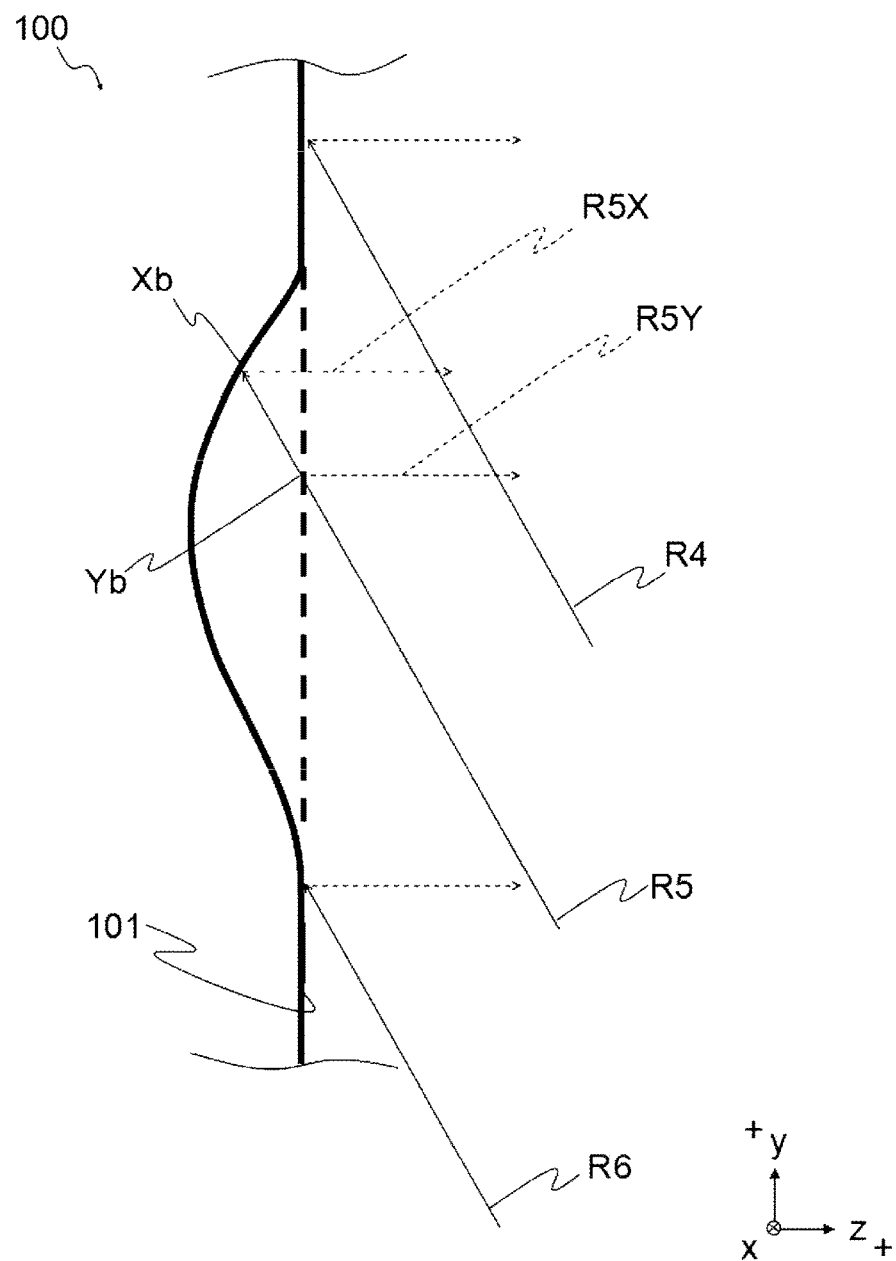
FIG. 16 is a schematic diagram illustrating how a light projected from the short-focus projector is reflected when the conventional reflective screen is recessed.

FIG. 16 is a schematic diagram illustrating, similar to FIG. 15, how the light projected from the short-focus projector 120 is reflected when the sheet 101 is recessed.

Projection lights R4, R5, and R6 are irradiated from the short-focus projector 120, reflect at the sheet 101 (see the solid-line arrows in FIG. 16), and are reflected forward (see the dotted-line arrows in FIG. 16). The projection light R5 is reflected at a point Xb on the recessed portion of the sheet 101 as a reflected light R5X. However, because the projection angle θ2 from the short-focus projector 120 is large, at about 60 to 70 degrees, a shift amount in the y direction between a reflected light R5Y reflected at a point Yb on the sheet 101 when the reflective screen 100 is not distorted and the reflected light R5X is considerably greater than the shift amount in the y direction between the reflected light R2Y and the reflected light R2X.

In this manner, when projecting the video from the short-focus projector 120 to the reflective screen 100, the distortion of the video becomes significantly visible by the position of the reflected light shifting due to the distortion arising in the reflective screen 100.

Figure 17:
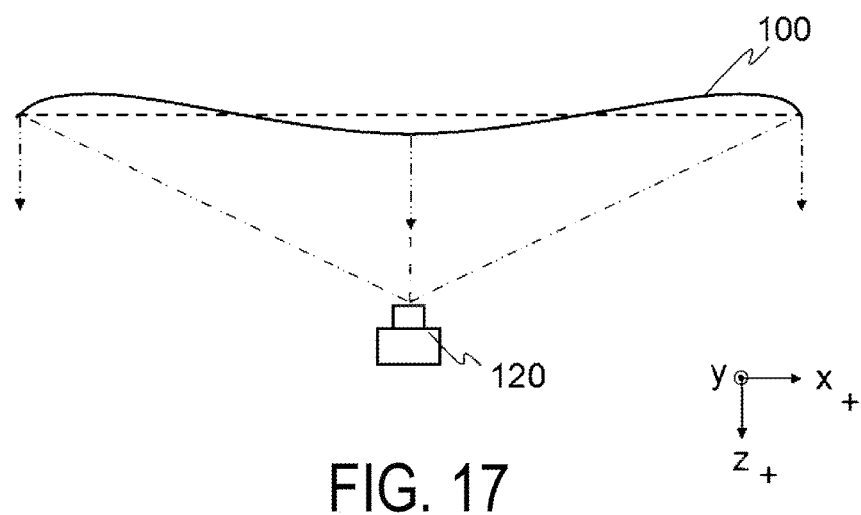
FIG. 17 is a diagram illustrating a case where the reflective screen is distorted in a horizontal direction.

FIG. 17 is a diagram illustrating when the reflective screen 100 is distorted in a horizontal direction. "When the reflective screen 100 is distorted in a horizontal direction" refers to a state where the reflective screen 100 is wavy when the reflective screen 100 is cut along an x direction. FIG. 17 illustrates a state of viewing the reflective screen 100 from a +y direction. Note that in FIG. 17, the dashed line illustrates a position of the reflective screen 100 when the reflective screen 100 is not distorted. Moreover, in FIG. 17, the two-dot-dash line schematically illustrates a portion of the projection light and the reflected light.

When the reflective screen 100 is distorted in the horizontal direction, for example, a vicinity of both ends in the x direction of the reflective screen 100 is recessed rearward while the end portions protrude forward. Moreover, a vicinity of a central portion in the x direction of the reflective screen 100 protrudes forward.

Figure 18:
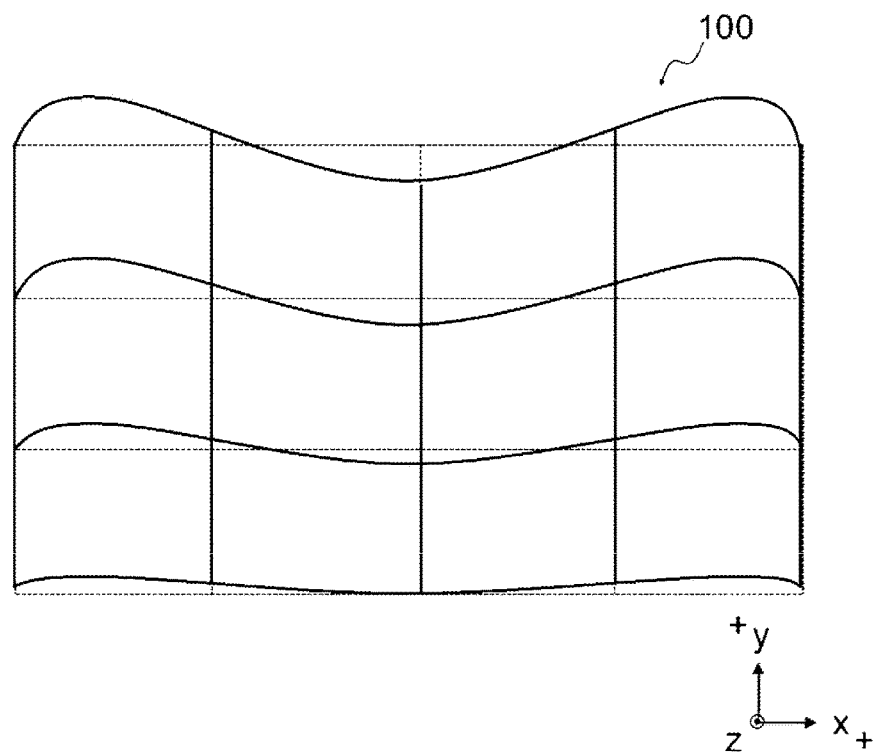
FIG. 18 is a diagram illustrating a result of projecting a video of a lattice pattern from the short-focus projector to the reflective screen distorted in the horizontal direction.

FIG. 18 is a diagram illustrating a result of projecting a video of a lattice pattern from the short-focus projector 120 to the reflective screen 100 distorted in the horizontal direction as illustrated in FIG. 17. The dashed lines in FIG. 18 illustrate the lattice pattern when being projected from the long-focus projector 110.

At the portion where the reflective screen 100 is recessed rearward, the projection image is displayed on an upper side of a position where the projection image is normally displayed (see FIG. 16). Moreover, at the portion protruding forward of the reflective screen 100, the projection image is displayed on a lower side of a position where the projection image is normally displayed. As a result, when a video of a lattice pattern of four frames wide and three frames high is projected from the short-focus projector 120 to the reflective screen 100 distorted in the horizontal direction as illustrated in FIG. 17, a horizontal line (line along the x direction) of the lattice pattern is visually recognized as a line where a vicinity of both ends is distorted to the upper side and a central portion is distorted to the lower side.

Furthermore, as illustrated in FIG. 14, because the short-focus projector 120 is provided obliquely below the reflective screen 100, an emission angle of the projection light becomes greater at an upper end (+y side) 104 of the reflective screen 100 than a lower end (−y side) 103 of the reflective screen 100. As a result, the closer to the upper end of the reflective screen 100, the greater the distortion of the line.

Figure 19:
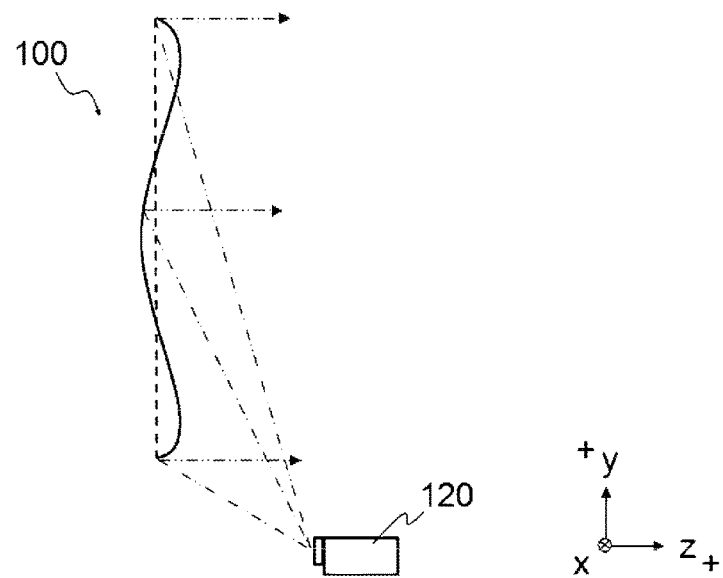
FIG. 19 is a diagram illustrating a case where the reflective screen is distorted in a vertical direction.

FIG. 19 is a diagram illustrating when the reflective screen 100 is distorted in a vertical direction. "When the reflective screen 100 is distorted in a vertical direction" refers to a state where the reflective screen 100 is wavy when the reflective screen 100 is cut along the y direction. FIG. 19 illustrates a state of viewing the reflective screen 100 from a −x side. Note that in FIG. 19, the dashed line illustrates the position of the reflective screen 100 when the reflective screen 100 is not distorted. Moreover, in FIG. 19, the two-dot-dash line schematically illustrates a portion of the projection light and the reflected light.

When the reflective screen 100 is distorted in the vertical direction, for example, a vicinity of both ends in the y direction of the reflective screen 100 is recessed forward while the end portions protrude rearward. Moreover, a vicinity of a central portion in the y direction of the reflective screen 100 protrudes rearward.

Figure 20:
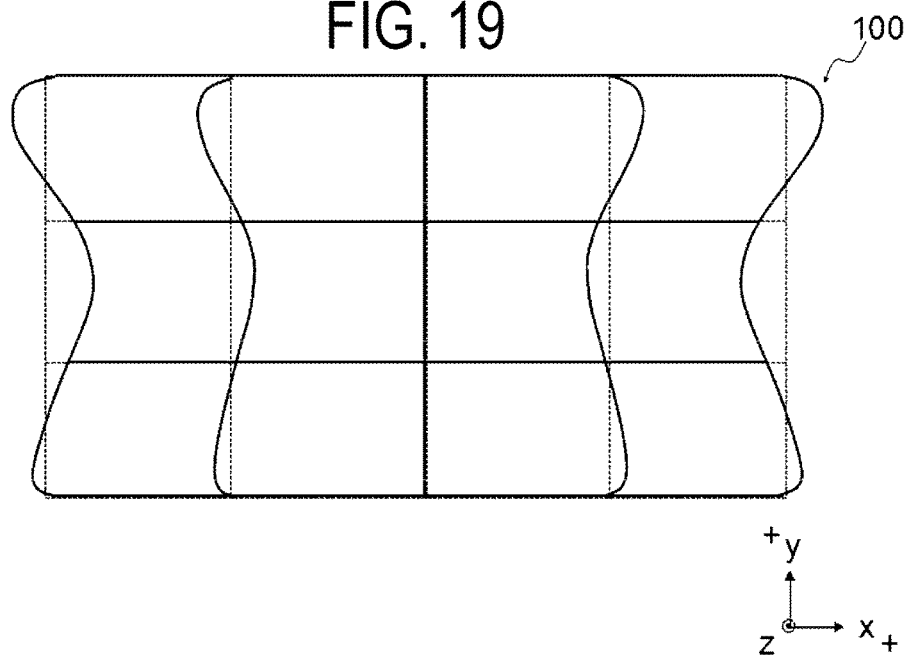
FIG. 20 is a diagram illustrating a result of projecting the video of the lattice pattern from the short-focus projector to the reflective screen distorted in the vertical direction.

FIG. 20 is a diagram illustrating a result of projecting the video of the lattice pattern from the short-focus projector 120 to the reflective screen 100 distorted in the vertical direction. Similar to FIG. 18, the dashed lines in FIG. 20 illustrate the lattice pattern when being projected from the long-focus projector 110.

As already described, at the portion where the reflective screen 100 is recessed rearward, the projection image is displayed on an upper side of a position where the projection image is normally displayed. Moreover, at the portion protruding forward of the reflective screen 100, the projection image is displayed on a lower side of a position where the projection image is normally displayed. As a result, when the video of the lattice pattern of four frames wide and three frames high is projected from the short-focus projector 120 to the reflective screen 100 distorted in the vertical direction as illustrated in FIG. 19, a vertical line (line along the y direction) of the lattice pattern is visually recognized as a line where a vicinity of both ends is distorted to an outer side and a central portion is distorted to an inner side.

In FIG. 20, because a position of the short-focus projector 120 in the X direction is in a substantially central portion of the reflective screen 100, the incidence angle of the projection light becomes greater in a vicinity of both ends in the +x direction and the −x direction of the reflective screen 100 than in a vicinity of the central portion in the x direction of the reflective screen 100. As a result, the closer to both ends in the +x direction and the −x direction of the reflective screen 100, the greater the distortion of the line. Moreover, similar to the situation illustrated in FIG. 18, the closer to the upper end of the reflective screen 100, the greater the distortion of the line.

In this manner, particularly when using the short-focus projector, because the distortion of the video becomes significantly recognized due to the distortion arising in the screen, there is a need to make distortion less likely to arise in the screen.

Below, detailed description will be given of an embodiment of the present invention with reference to the drawings.

Figure 1:
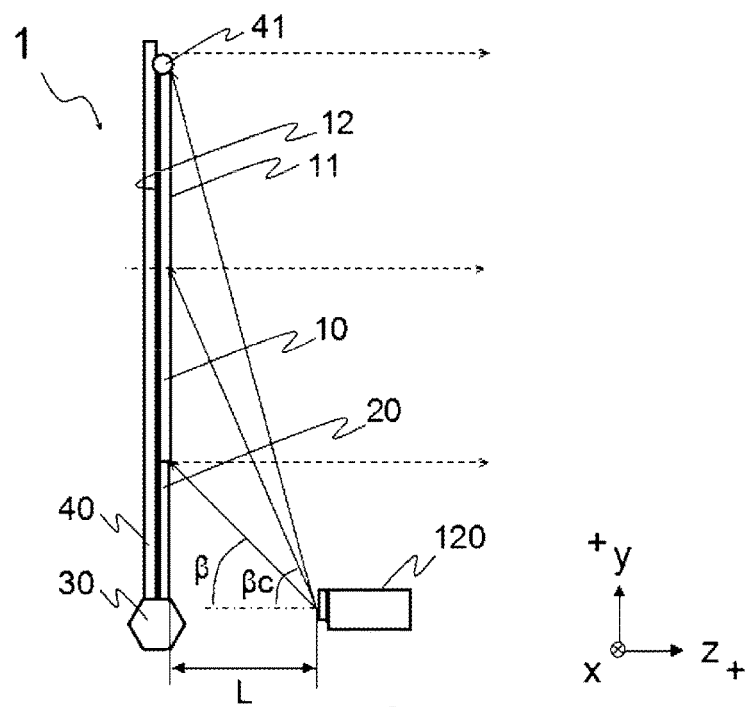
FIG. 1 is a side view illustrating an overview of a reflective screen of one example of the present invention.

FIG. 1 is a side view illustrating an overview of a reflective screen 1. FIG. 1 also illustrates the projector 120. In the present embodiment, the reflective screen 1 is formed to reflect to the front the light irradiated from the short-focus projector 120.

Figure 2:
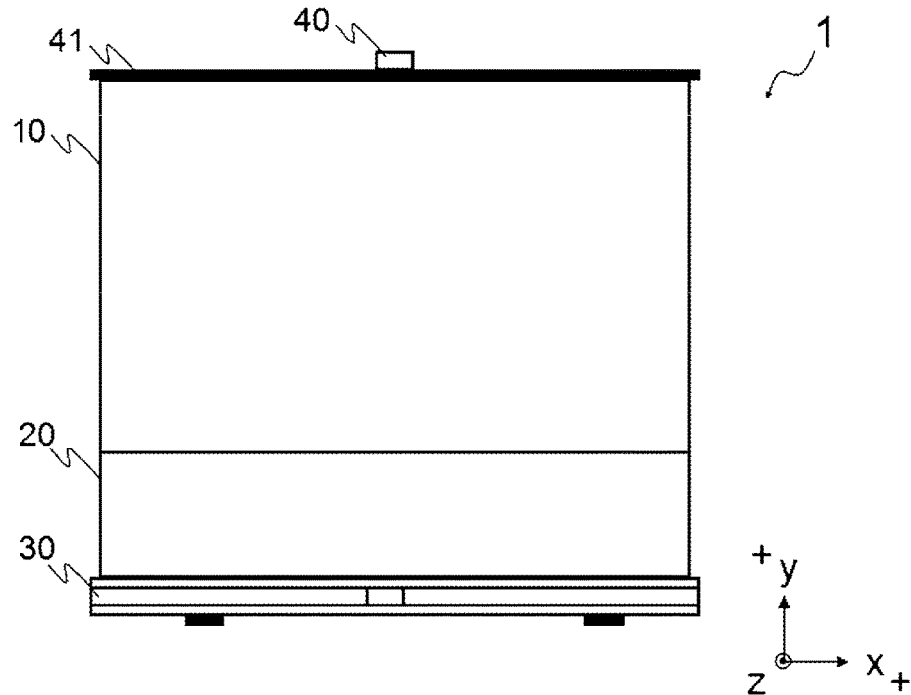
FIG. 2 is a front view illustrating an overview of the reflective screen.

FIG. 2 is a front view illustrating an overview of the reflective screen 1. The reflective screen 1 has a screen 10, a skirt 20, a base 30, a pole 40, and a top bar 41.

The screen 10 is molded using a resin having a high elastic modulus. Specifically, the resin having the high elastic modulus is a resin having mechanical properties of a tensile strength of about 40 Mpa and a tensile elongation of about 550% and is a resin including one or two or more types in combination of a polystyrene, a polyolefin, vinyl chloride, polyurethane, or an amide-based elastomer. Moreover, the screen 10 also includes a material that absorbs light. Specifically, a pigment, such as carbon black, perylene black, or the like can be used. The screen 10 is of a sheet shape having flexibility. A configuration of the screen 10 is described below.

The skirt 20 is not limited in particular as long as it is configured by a material whose material properties (mechanical properties and the like) are close to those of the screen 10. For example, the material of the skirt 20 can use one or two or more type in combination of a polystyrene, a polyolefin, vinyl chloride, polyurethane, or an amide-based elastomer. The skirt 20 is adhered to a lower end of the screen 10.

The base 30 is a case that stores the screen 10. Provided inside is a shaft and a spring (not illustrated) for winding the screen 10, and the spring biases the shaft with a force in a direction of winding the screen 10 around the shaft.

The pole 40 is an expandable pole and is provided to the base 30. When unwinding the screen 10, pulling an upper end of the screen 10 against the biasing force of the spring and hooking the screen 10 on a tip of the extended pole 40 places the screen 10 in an unwound state.

The top bar 41 is provided on the upper end of the screen 10 and raises a width direction (that is, the x direction) of the screen 10 evenly when unwinding the screen 10 in the y direction. A metal (for example, aluminum or the like), a plastic (for example, polystyrene, polyethylene, or the like), wood, or the like can be used as a material of the top bar 41. From a viewpoint of rigidity, using aluminum is preferable.

A cross-sectional shape of the top bar 41 includes a circular shape but is not limited thereto.

Figure 3:
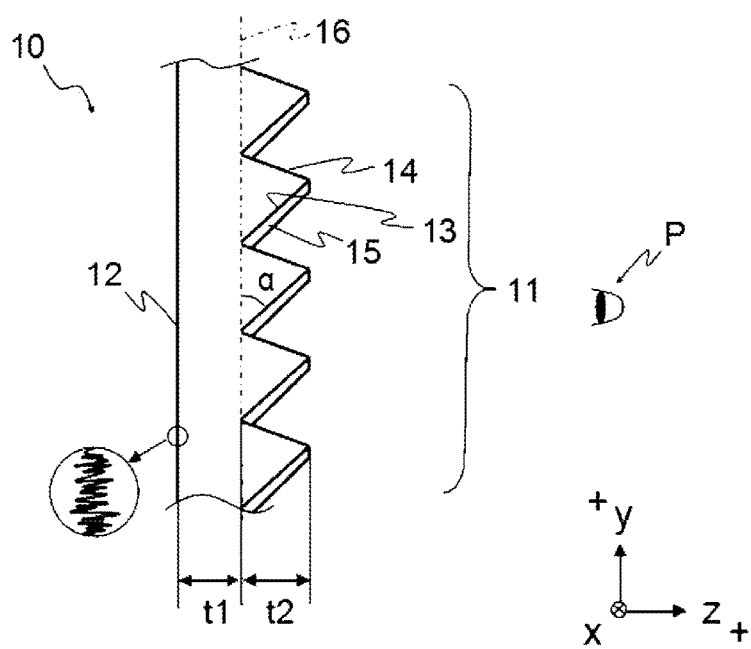
FIG. 3 is a cross-sectional view of when the screen is cut at a plane along a y direction.

FIG. 3 is a cross-sectional view of when the screen 10 is cut at a plane along the y direction. The screen 10 mainly has a projection surface 11 (corresponding to "first surface") having a plurality of inclined portions and a reverse surface 12 (corresponding to "second surface") that is a surface on an opposite side of the projection surface.

On a projection-surface 11 side of the screen 10, a projection-side inclined surface 13 and a non-projection-side inclined surface 14 are formed. The projection-side inclined surface 13 is provided at an orientation wherein the light from the short-focus projector 120 is incident, and the non-projection-side inclined surface 14 is provided at an orientation wherein the light from the short-focus projector 120 is not incident. The projection-side inclined surface 13 and the non-projection-side inclined surface 14 form a prism of a sawtooth shape by being disposed repeating in alternation in the vertical direction (y direction).

A white resin layer 15 is provided on the projection-side inclined surface 13. The white resin layer 15 reflects to the front, that is, to an observer-P side, the light of the short-focus projector 120. Meanwhile, the non-projection-side inclined surface 14 absorbs a majority of external light. Note that in the description of the present embodiment, "reflection" includes "regular reflection" and "diffuse reflection".

The white resin layer 15 has a filler that reflects light and a binder resin. The filler included in the white resin layer 15 is a filler that reflects the projected video light, specifically, silica, titanium oxide, mica, barium sulfate, barium chloride, aluminum, or the like. The binder resin forming the white resin layer 15 is a thermoplastic resin, a UV-curing resin, a thermosetting resin, or the like, specifically, a urethane resin, a vinyl chloride resin, a polyolefin resin, a polyester resin, or the like. One or a combination of these resins may be used. As the binder resin, from a viewpoint of adhesion with the projection-side inclined surface 13, using the urethane resin is preferable. Note that the white resin layer 15 may include, other than the filler and the binder resin, a curing agent, an antistatic agent, an antifouling agent, a UV absorbent that prevents degradation of the binder resin, and the like.

By coating the white resin layer 15 on the projection-side inclined surface 13, the video light projected from the short-focus projector 120 to the projection-side inclined surface 13 can be efficiently reflected to improve a contrast of the screen 10. By this, the video light can undergo diffuse reflection such that a sufficient viewing angle is obtained. Note that a surface of the white resin layer 15 may be a matte finish or a satin finish.

The projection-side inclined surface 13 and the non-projection-side inclined surface 14 are provided in parallel in alternation in the vertical direction (y direction). Specifically, the projection-side inclined surface 13 is provided on a surface on a lower side (that is, the −y direction) of the prism and the non-projection-side inclined surface 14 is provided on a surface on an upper side (that is, the +y direction) of the prism. Therefore, when the short-focus projector 120 is disposed in a position in front of and below the screen 10, the video light becomes viewable from the front.

An angle $\alpha$ formed between the projection-side inclined surface 13 and a screen reference plane 16 can be obtained from an angle $\beta$ of the video light emitted from the short-focus projector 120 relative to the horizontal direction (referred to as "incidence angle" hereinbelow; see FIG. 1), and a relational expression of $\beta=2\alpha$ is satisfied. Moreover, the incidence angle $\beta$ changes according to a distance L between the short-focus projector 120 and the screen 10 and a position in the vertical direction wherein the video light is incident on the screen surface (referred to as "height" hereinbelow).

In the present embodiment, so that an evenness of a brightness viewed from the front is not impaired and a bright video can be displayed even if the distance L between the short-focus projector 120 and the screen 10 changes slightly, the angle α is uniquely determined based on an incidence angle βc (see FIG. 1) of when the video light is incident at a position on a centerline of the screen 10. That is, all prisms are formed so the angle α becomes βc/2, an angle whereat the video light of the incidence angle βc is reflected to the front of the screen. Note that to reflect the incident light to the front, α=βc/2 is ideal, but the angle α can be changed as appropriate in consideration of a position of the observer and the contrast.

A plurality of irregularities is formed on the reverse surface 12 of the screen 10. The irregularities prevent blocking, where, when winding the screen 10, the projection surface 1 and the reverse surface 12 of the screen 10 adhere and do not separate.

The irregularities may be formed by, for example, forming a grain or the like or coating an ink or the like (for example, printing a plurality of intersecting lines). Specific examples are described in detail below.

A thickness between the screen reference plane 16 and the reverse surface 12 is t1, and a thickness between the screen reference plane 16 and a tip of the projection surface 11 is t2. Measurement of the thicknesses is performed by confirming the cross section of the screen 10 by an optical microscope (Digital Microscope VHX-500, manufactured by Keyence). Specific examples are described in detail below.

A manufacturing method of the screen 10 in the present embodiment is described. First, a heated and melted urethane resin is coated using a coater on a PET (polyethylene terephthalate) film of a film shape (for example, 125 μm (micrometers)) applied with a release treatment on one surface so that a thickness after cooling becomes a predetermined thickness (for example, 250 μm) to form a urethane resin sheet. Next, the urethane resin sheet is again heated, to about 200° C.; a softened urethane resin surface is pressed into a mold having a shape of the prism; and the urethane resin sheet is cooled in this state.

Next, the urethane resin sheet is peeled from the mold, and the white resin layer 15 is formed. The white resin layer 15 can be formed by, for example, coating by a reverse coater a resin composition, where silica is added to and mixed with a urethane resin dissolved by an organic solvent, on the projection-side inclined surface 13 and heating and drying the resin composition for 2 minutes at 100° C. Note that the resin composition may be coated by a coater other than the reverse coater, such as a comma coater, a gravure coater, or a wire-bar coater.

Afterward, the screen 10 is obtained by peeling the PET film from the urethane resin sheet. Here, a film where the irregularities are formed on a surface of the PET film may be used. When the urethane resin sheet is made using this PET film, the irregularities of the PET-film surface are transfer-molded on the urethane resin sheet. That is, the irregularities are formed on a surface (corresponding to "second surface") on an opposite side of a surface (corresponding to "first surface") whereon the prism of the urethane resin sheet is formed.

By this, a surface treatment of forming the irregularities becomes possible without increasing a number of steps. Moreover, by this surface treatment of forming the irregularities, blocking of the urethane resin sheet, that is, between the screen 10, when the urethane resin sheet is wound and stored in the base 30 can be prevented. From a viewpoint of blocking prevention, a size of the irregularities is such that a surface roughness Ra (arithmetic-mean roughness according to JIS B 0601-2001) is no less than 0.10 (desirably 0.3 to 0.5) and a surface glossiness (Gs (60°) according to JIS Z 8741) when the incidence angle is 60 degrees (60° incidence) is no greater than about 20% (desirable 10%). The surface glossiness Gs (60°) is measured using a glossmeter, GMX-203 manufactured by Murakami Color Research Laboratory. Note that the surface treatment that forms the irregularities is not limited to transfer-molding and also includes, for example, sandblasting.

Furthermore, the irregularities may be formed by coating the ink on the second surface. Specifically, printing is performed on the second surface of the urethane resin sheet after the PET film is peeled. In the present embodiment, the irregularities are formed on the second surface by printing a latticed rib on the second surface. As a printing method, for example, ink-jet printing or screen printing can be used.

A pattern of printing is not limited in particular; other than a latticed pattern, a pattern with a design such as a checkered pattern can be adopted. By this, a strength of the urethane resin sheet increases due to the ink printed on the second surface. The pattern of printing is described in detail below.

Furthermore, a color, a material, and the like of the ink can also be optionally set. With the strength of the urethane resin sheet, a shape of the irregularities can be adjusted by increasing a printing density, that is, by coating the ink thicker. By this, blocking between the screens 10 can be prevented and a flatness of the screen 10 can be made favorable. This is described in detail below. Note that the irregularities from printing may be additionally formed on the irregularities of the urethane resin sheet where transfer-molding is performed by the irregularities of the surface of the PET film.

EXAMPLES

Next, embodiments of the present invention are described together with comparative examples. Note that the present invention is not limited to the embodiments below.

Example 1

The screen 10 of Example 1 is made by the manufacturing method of the screen 10 described above. The thickness of the screen 10 of Example 1 is such that the thickness t1 is 100 μm and the thickness t2 is 200 μm. Moreover, the irregularities from transfer-molding and not the irregularities from printing are on the surface (corresponding to "second surface") on the opposite side of the surface (corresponding to "first surface") whereon the prism of the urethane resin sheet is formed. A relationship between t1 and t2 in Example 1 is, as a result of thickness measurement, such that t1 is about half of t2, that is, t1=t2/2.

Example 2

The difference between Example 1 and Example 2 is in a presence or absence of rib printing, and Example 1 and Example 2 are otherwise identical. In Example 2, the urethane resin sheet is made by a method similar to that in Example 1; next, the rib is printed on the reverse surface 12 (corresponding to "second surface") wherefrom the PET film is peeled to obtain the screen 10. The thickness of the screen 10 of Example 2 is such that the thickness t1 is 110 μm and the thickness t2 is 200 μm.

Figure 4:
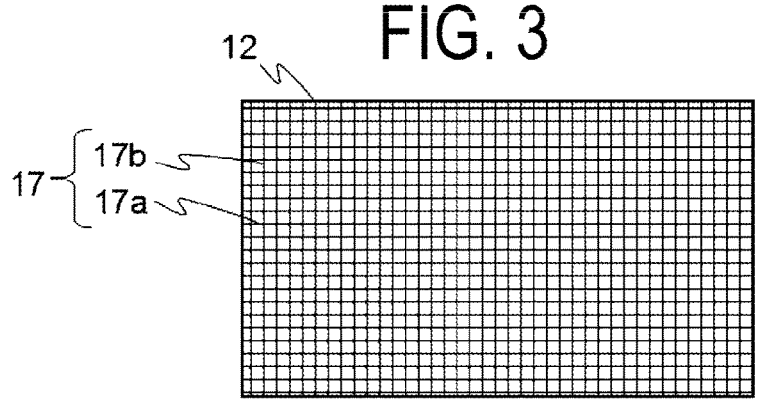
FIG. 4 is a diagram illustrating a shape of a rib printed on a reverse surface.

FIG. 4 is a diagram illustrating a shape of the printed rib. The rib 17 has a rib 17a along the x direction and a rib 17b along the y direction. The latticed pattern is formed by forming each of the ribs 17a and ribs 17b in plurality. The rib 17 is formed over an entirety of the reverse surface 12.

Upon measuring by a micrometer (manufactured by Mitutoyo), a height (protrusion amount from the reverse surface 12) of the ink (the lattice, that is, the rib 17) is about 10 μm. Moreover, a distance between adjacent ribs 17 is about 1.0 mm.

Example 3

The difference between Example 3 and Example 1 is in the thickness of t1, the other configurations are identical. The thickness of the screen 10 of Example 3 is such that the thickness t1 is 150 μm and the thickness t2 is 200 μm. The relationship between t1 and t2 in Example 3 is such that t1 is about three-fourths of t2, that is, $t1=t2\times\frac{3}{4}$.

Example 4

The difference between Example 4 and Example 3 is in the presence or absence of rib printing; the other configurations are identical. The thickness of the screen 10 of Example 4 is such that the thickness t1 is 160 μm and the thickness t2 is 200 μm. The screen 10 is made by forming the urethane resin sheet and printing the rib 17 on the surface wherefrom the PET film is peeled (reverse surface 12). Similar to Example 2, the rib 17 printed on the reverse surface 12 in Example 4 has a height of about 10 μm and a distance between adjacent ribs 17 of about 1.0 mm.

Example 5

The difference between Example 5 and Example 4 is in the thickness of t1; the other configurations are identical. The thickness of the screen 10 of Example 5 is such that both the thickness t1 and the thickness t2 are 200 μm. The relationship between t1 and t2 in Example 5 is such that the thicknesses of t1 and t2 are about identical, that is, $t1=t2$.

Example 6

The difference between Example 6 and Example 5 is in the thickness of t1; the other configurations are identical. The thickness of the screen 10 of Example 6 is such that the thickness t1 is 400 μm and the thickness t2 is 200 μm. In Example 6, t1 is about 2 times t2, that is, $t1=t2\times2$.

Comparative Example 1

The difference between Comparative Example 1 and Example 6 is in the thickness of t1; the other configurations are identical. The thickness of the screen 10 of Comparative Example 1 is such that the thickness t1 is 450 μm and the thickness t2 is 200 μm. In Comparative Example 1, t1 is about 2.25 times t2.

Comparative Example 2

In Comparative Example 2, the urethane resin sheet is formed on a PET film whose thickness is 125 μm so that the thickness t1 is 150 μm and the thickness t2 is 200 μm, and this configuration is made to be the screen 10. A total thickness of Comparative Example 2 is 475 μm.

Two types of measurement tests, i.e. measurement of distortion and measurement of loop stiffness were performed on the screens of these Examples 1 to 6 and Comparative Examples 1 and 2.

Measurement of Distortion

Measurement of distortion was performed as follows.

Figure 5:
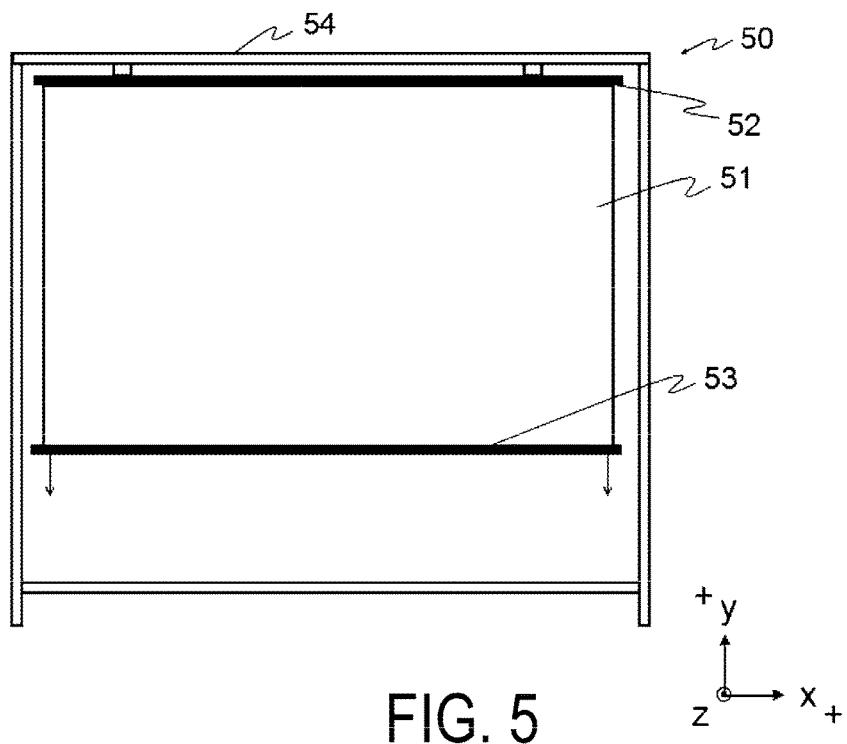
FIG. 5 is a schematic view illustrating a test screen.

First, a test screen was prepared. FIG. 5 is a schematic view illustrating a test screen 50. The screen 10 of Examples 1 to 6 and Comparative Examples 1 and 2 were cut to a size of 1550 mm×900 mm (corresponding to a 70W-size screen), and rod members 52 and 53 (for example, round pipes) were attached above and below the cut screen (referred to as "screen 51" hereinbelow). The rod member 52, which was attached to an upper end of the screen 51, was attached to a stand 54, and a weight of about 3 kg as attached to the rod member 53, which was attached to a lower end of the screen 51. Specifically, weights of about 1.5 kg was attached in a position about 100 mm from each of both ends of the rod member 53.

Next, the projector was disposed. In the present test, H5350 manufactured by Acer was used as the long-focus projector 110 and PDG-DWL 2500 manufactured by Sanyo was used as the short-focus projector 120.

The projector was disposed before projecting the video to the screen 51. Using each of the long-focus projector 110 and the short-focus projector 120, a reference line was projected to a white plate 55 (see FIG. 6), and the distance, the angle, and the like of the long-focus projector 110 and the short-focus projector 120 were adjusted so the reference lines projected to the white plate match.

Figure 6:
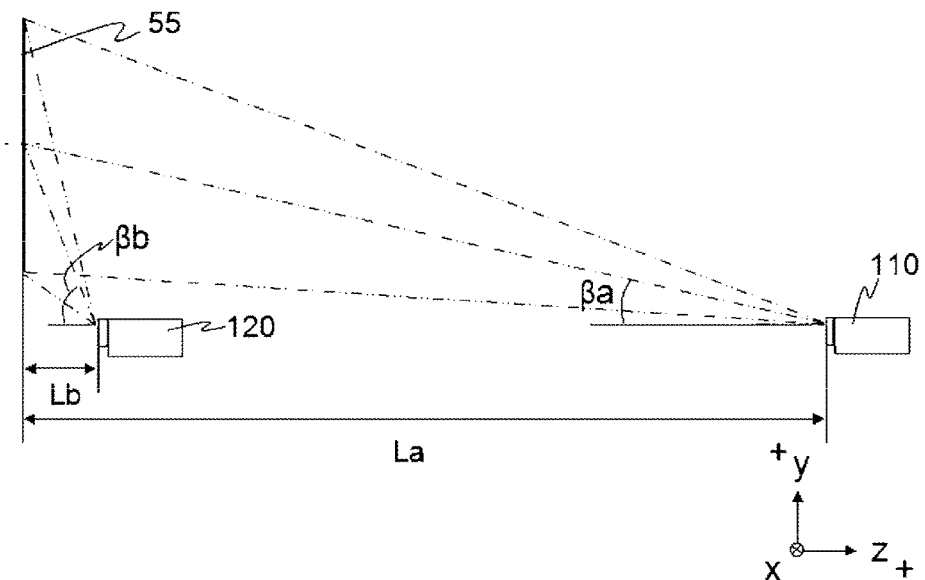
FIG. 6 is a diagram illustrating a positional relationship between a long-focus projector and a short-focus projector.

In the present test, as illustrated in FIG. 6, a projection distance La from the white plate 55 to the long-focus projector 110 was about 2750 mm, and a projection distance Lb from the white plate 55 to the short-focus projector 120 was about 250 mm. Moreover, at a center of the screen 51, an incidence angle βa of the long-focus projector 110 was about 15 degrees and an incidence angle βb of the short-focus projector 120 was about 63 degrees.

After disposing the projector, the test screen 50 was placed in the position of the white plate 55. Then, a measurement pattern was projected to the screen 51 by the short-focus projector 120 and the long-focus projector 110 to measure a shift amount of a projection line in a predetermined position (referred to as "measurement point" hereinbelow). With the shift amount, a shift in a position of the reference line projected by the short-focus projector 120 on a screen 51 surface relative to a position of the reference line projected by the long-focus projector 110 to the screen 51 was measured using a ruler.

Figure 7:
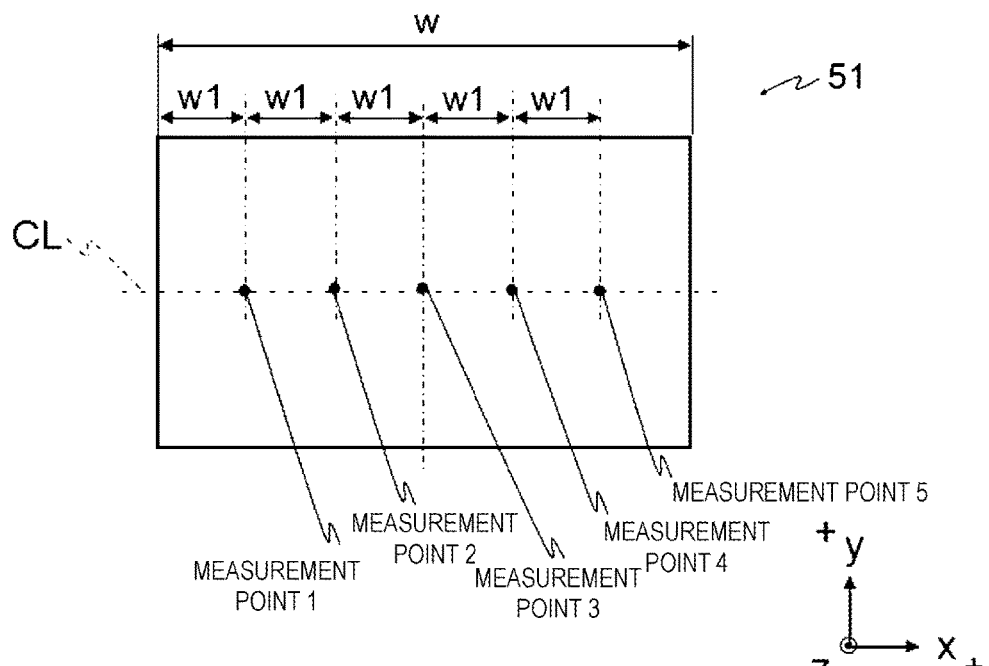
FIG. 7 is a diagram illustrating positions of measurement point 1, measurement point 2, measurement point 3, measurement point 4, and measurement point 5 on the screen.

The measurement point was set on a reference line CL projected by the long-focus projector 110 to the screen 51. FIG. 7 is a diagram illustrating positions of measurement point 1, measurement point 2, measurement point 3, measurement point 4, and measurement point 5. The reference line CL was positioned at a distance of 450 mm from each of the lower end of the screen 51 or the upper end of the screen 51. That is, the reference line CL was a line positioned in a substantially central portion in a height direction (y direction) of the screen.

A width w of the screen 51 was 1500 mm. Measurement point 1 was in a position 258 mm horizontally toward the central portion (+x direction) from a left-side end portion of the screen 51 (w1=258 mm), and measurement point 2 was in a position 258 mm (=w1) horizontally toward the central portion (+x direction) from measurement point 1. Similarly, measurement point 3 was positioned 258 mm (=w1) in the +x direction from measurement point 2, measurement point 4 was positioned 258 mm (=w1) in the +x direction from measurement point 3, and measurement point 5 was positioned 258 mm (=w1) in the +x direction from measurement point 4.

Measuring Loop Stiffness

A test piece used to measure the loop stiffness was one where the screen 10 of Examples 1 to 6 and Comparative Examples 1 and 2 were cut to a size of 25 mm×150 mm. A loop-stiffness value was measured by setting the test piece in a loop-stiffness tester, model DA, manufactured by Toyo Seiki Seisaku-Sho. Here, the loop-stiffness value is an indicator representing a size of a resistance against crushing of the test piece made into a loop shape. In the present embodiment, the loop-stiffness value was measured using the loop-stiffness tester model DA manufactured by Toyo Seiki Seisaku-Sho.

Figure 8:
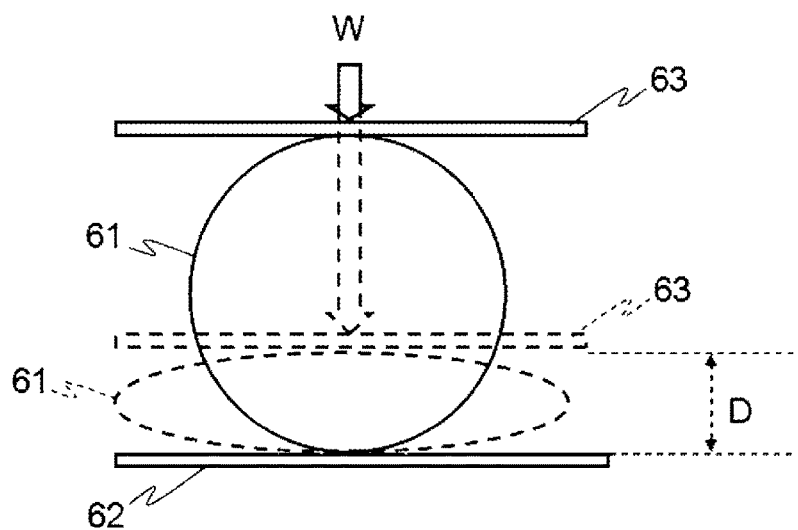
FIG. 8 is a schematic diagram illustrating measuring a loop-stiffness value.

FIG. 8 is a schematic diagram illustrating measuring the loop-stiffness value. The loop-stiffness tester model DA mainly had a horizontal base 62 and a plate 63, and a test piece 61 was inserted between the horizontal base 62 and the plate 63. The loop-stiffness tester model DA pressed the plate 63 in a downward direction (compression direction) at a speed of 3.3 mm/min. Upon a diameter (referred to as "loop length" hereinbelow) of the test piece 61 being made to be 60 mm (see the solid lines in FIG. 8). The loop-stiffness tester model DA pressed (see the dotted lines in FIG. 8) the plate 63 until a distance D in the compression direction of the test piece 61 was 10 mm; at this time, a load W applied to the plate 63, that is, the test piece 61, was measured as the loop-stiffness value.

Measurement Results (1) Measurement Results of Distortion

Table 1 shows distortion measurement results for Examples 1 to 5 and Comparative Examples 1 and 2. When no distortion was arisen in the central portion (corresponding to measurement point 2, measurement point 3, and measurement point 4) of the screen 51 (where distortion measurement value was 0), the flatness was evaluated as good (here, good includes good and excellent). Of those whose flatness was evaluated as good, those with a particularly high flatness, for example, those where an absolute value of a distortion measurement value at each measurement point was no greater than 5, was evaluated with a flatness of excellent.

In Comparative Examples 1 and 2, no distortion was arisen at measurement point 3 alone and distortion was arisen at all other points (measurement point 1, measurement point 2, measurement point 4, and measurement point 5). In contrast, no distortion was arisen at measurement point 2, measurement point 3, and measurement point 4 in Examples 1 to 6. From this, it is understood that when the thickness t1 was no more than about 2 times the thickness t2, no distortion arises in the central portion of the screen 51 and a screen with a high flatness can be obtained. Here, the central portion was a range including measurement points 2 to 4, that is, a range including a substantially central portion of the screen 51, and was about ±258 mm in the x direction.

In Examples 2, 3, and 5, the distortion measurement value at measurement point 1 and measurement point 5 was −5. Moreover, with Example 4, the distortion measurement value at measurement point 1 was −5 and the distortion measurement value at measurement point 5 was 0. −5 mm was a size where in a use state (a distance from the screen 51 of 3000 mm; this corresponds to about 3 to 4 times the height of the screen 51), no distortion can be visually recognized; Examples 2 to 5 excel particularly in flatness. That is, it is understood that when the thickness t1 is greater than half of the thickness t2 and the thickness t1 is no more than the thickness t2, a screen with a particularly high flatness can be obtained.

In comparing Example 1 and Example 3, it is understood that the distortion at measurement point 1 was greater in Example 1 than in Example 3. This is thought to be because the urethane resin sheet configuring the screen 51 was soft. In this situation, distortion became more likely to arise at an end portion of the screen 51. From the above, it is desirable to make the thickness t1 no less than ¾ of the thickness t2 and no greater than the thickness t2 when no printing is performed on the reverse surfaces 12 of the screen 51.

Furthermore, in considering the relationship between Example 1 and Example 2 and the relationship between Example 3 and Example 4, it is understood that the flatness was increased further by coating the ink in a lattice on the reverse surface 12. Moreover, as described above, it is also simultaneously confirmed that by performing the surface treatment of forming the irregularities on the reverse surface 12, blocking of the urethane resin sheet when winding and storing the urethane resin sheet in the base 30, that is, blocking between the sheets 10, can be prevented. In particular, while Example 1 had a worse flatness than Example

TABLE 1

| | | Example 1 | Example 2 | Example 3 | Example 4 | Example 5 | Example 6 | Comparative Example 1 | Comparative Example 2 |
|---|---|---|---|---|---|---|---|---|---|
| Thickness t1 (μm) (In parentheses are breakdowns) | | 100 | 110 (PU 100, ink 10) | 150 | 160 (PU 150, ink 10) | 200 | 400 | 450 | 275 (PU 150, PET 125) |
| Thickness t2 (μm) | | 200 | 200 | 200 | 200 | 200 | 200 | 200 | 200 |
| Flatness | | Good | Excellent | Excellent | Excellent | Excellent | Good | Poor | Poor |
| Distortion measurement value | Measurement point 1 | −10 | −5 | −5 | −5 | −5 | −10 | −10 | −10 |
| | Measurement point 2 | 0 | 0 | 0 | 0 | 0 | 0 | +5 | −10 |
| | Measurement point 3 | 0 | 0 | 0 | 0 | 0 | 0 | 0 | 0 |
| | Measurement point 4 | 0 | 0 | 0 | 0 | 0 | 0 | −5 | −20 |
| | Measurement point 5 | −5 | −5 | −5 | 0 | −5 | −5 | −15 | −20 |
| | Average of absolute values | 3 | 2 | 2 | 1 | 2 | 3 | 7 | 12 |

3, a flatness similar to that of Example 3 was obtained in Example 2. This is because performing printing on the reverse surfaces 12 made the thickness t1 thicker by a thickness of the ink, which added hardness to the urethane resin sheet.

(2) Measurement Results of Distortion

Table 2 shows loop-stiffness measurement results for Examples 1 to 5 and Comparative Examples 1 and 2. Due to its high rigidity that exceeded a measurement limit of the loop-stiffness tester, the loop-stiffness value of Comparative Example 2 was measured using a test piece rolled into a substantially cylindrical shape of a height of 10 mm and a loop length of 60 mm. With the loop-stiffness value, a numerical value was converted by multiplying a measurement value thereof by 2.5 (=25 mm/10 mm) and performing measurement under conditions similar to those of the other test pieces (height of 25 mm, loop length of 60 mm).

TABLE 2

|  | Example 1 | Example 2 | Example 3 | Example 4 | Example 5 | Example 6 | Comparative Example 1 | Comparative Example 2 |
|---|---|---|---|---|---|---|---|---|
| Thickness t1 (μm) (In parentheses are breakdowns) | 100 | 110 (PU 100, ink 10) | 150 | 160 (PU 150, ink 10) | 200 | 400 | 450 | 275 (PU 150, PET 125) |
| Thickness t2 (μm) | 200 | 200 | 200 | 200 | 200 | 200 | 200 | 200 |
| Loop stiffness (mN) | 10 | 22 | 25 | 42 | 38 | 369 | 489 | 2360 |
| Flatness | Good | Excellent | Excellent | Excellent | Excellent | Good | Poor | Poor |

From Table 2, it is understood that in Examples 1 to 6, the loop-stiffness value was no greater than 369 mN (milli-Newtons), which was a smaller loop-stiffness value than those of Comparative Examples 1 and 2. Moreover, from Table 2, it is understood that particularly when the distortion measurement value at each measurement point was no greater than −5, the loop-stiffness value was no less than 22 mN and no greater than 42 mN.

According to the present embodiment, when the thickness t1 at a portion other than the prism portion of the screen, which is a resin sheet, is no more than about 2 times the thickness t2 of the prism portion, a screen where no distortion arises in the central portion of the screen and whose flatness is high can be obtained.

For example, when another resin sheet (for example, a PET resin sheet) of a thickness of a substantially equal extent was integrated with the reverse surface of the resin sheet, the screen became hard and the tension applied on the screen when the screen was unwound became uneven, which gives rise to remarkable distortion of the screen surface (see Comparative Example 2).

In contrast, when no other resin sheet was provided to the reverse surface of the resin sheet, the screen was configured by the resin sheet alone, and the thickness t1 of the portion other than the prism portion was made to be no more than about 2 times the thickness t2 of the prism portion, variation in the tension applied to the screen when the screen is unwound was dispersed, which enabled a high flatness to be obtained. However, the present embodiment does not exclude forms where a thin film, sheet, or the like is provided to the reverse surface of the screen, as long as the flatness of the screen is not affected.

Furthermore, according to the present embodiment, by forming the irregularities over the entirety of the reverse surface of the screen, blocking where the projection surface and the reverse surface of the screen adhere and do not separate when the screen is wound can be prevented. Particularly when forming the irregularities by coating the ink over the entirety of the reverse surface of the screen, the flatness can be increased further by adding only a little more hardness to the screen.

Note that in the present embodiment the irregularities are formed over the entirety of the reverse surface 12 of the screen by the surface treatment that forms the irregularities or by printing, but a size or the like of the irregularities does not have to be constant.

Figure 9:
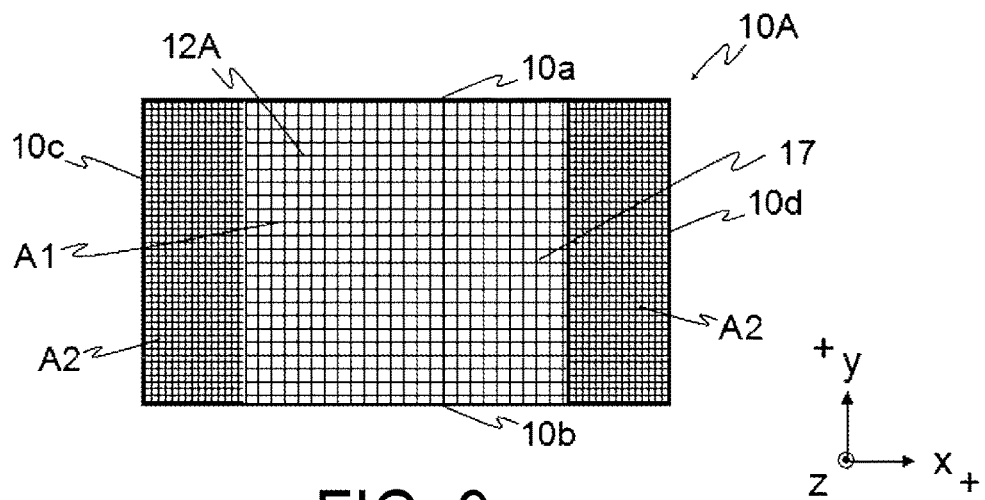
FIG. 9 is a diagram illustrating a latticed rib formed on a reverse surface of a screen according to a modified example.

FIG. 9 is a diagram illustrating a latticed rib formed on a reverse surfaces 12A of a screen 10A according to a modified example. In the screen 10A, a size of the lattice formed in a region A1 is greater than a size of the lattice formed in a region A2, which is a region other than the region A1. In the present embodiment, one frame in the lattice formed in the region A1 is about 0.1 mm (a distance between adjacent ribs is about 1.0 mm) and one frame in the lattice formed in the region A2 is about 0.5 mm (a distance between adjacent ribs is about 0.5 mm).

The region A1 is a region including a central portion of the screen 10A and upper and lower sides 10a and 10b, and the region A2 is a region including sides 10c and 10d of both ends, left and right, of the screen 10A. In this manner, by making an interval of the ribs 17 printed in the region A1 wider than an interval of the ribs 17 printed in the region A2 (changing a density (roughness) of the irregularities), an amount of ink coated in the region A1 can be made greater than an amount of ink coated in the region A2. As a result, the sides 10c and 10d of the screen 10A curling, wrinkles arising in the screen 10A, and the like can be prevented, and local distortion of the screen 10A can be prevented.

A method of making the amount of ink coated in the region A1 greater than the amount of ink coated in the region A2 is not limited to a method of changing the density of the irregularities. For example, the size of the lattice in the region A1 and the size of a lattice in the region A2 can be made the same but a height of the rib 17 in the region A2 can be made greater than a height of the rib 17 in the region A1.

Note that a method of changing the irregularities between the region A1 and the region A2 is not limited thereto. For example, when applying a roughening treatment to the reverse surface, a surface roughness of the region A1 may be made coarser grained while a surface roughness of the region A2 may be made finer grained. For example, it is sufficient to make an average interval Sm (see JIS B 0601-2001) between the irregularities in the region A1 greater than an average interval Sm between the irregularities in the region A2.

Figure 10:
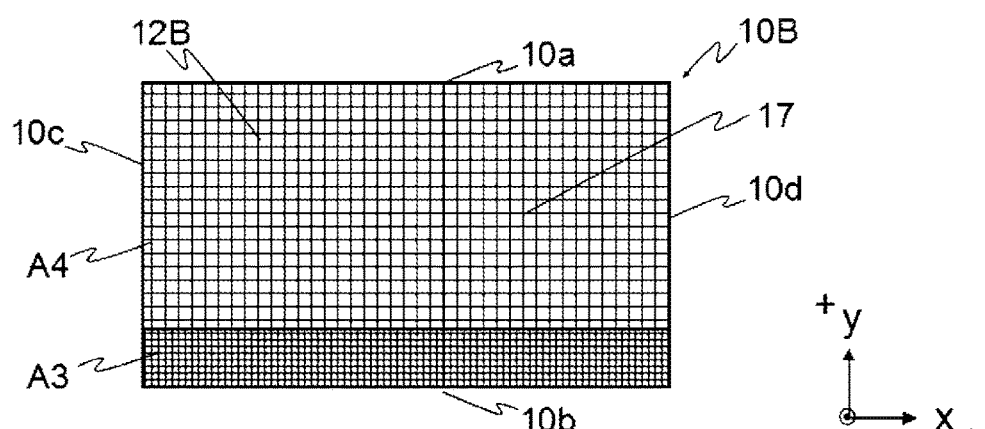
FIG. 10 is a diagram illustrating the rib formed on a reverse surface of a screen according to an embodiment of a modified example where a size of the lattice formed in a region A3, which includes a connecting portion between the screen and a skirt, is smaller than a size of the lattice formed in a region A4, which is a region other than the region A3.

Furthermore, the regions where the size, the roughness, and the like of the irregularities are changed is not limited to the situation illustrated in FIG. 9. FIG. 10 is a form where a size of the lattice formed in a region A3 including a connection portion between a screen 10B and the skirt 20 is made smaller than a size of the lattice formed in a region A4, which is a region other than the region A3. The region A4 is a region including the central portion of the screen 10A and the sides 10a, 10c, and 10d.

Figure 11:
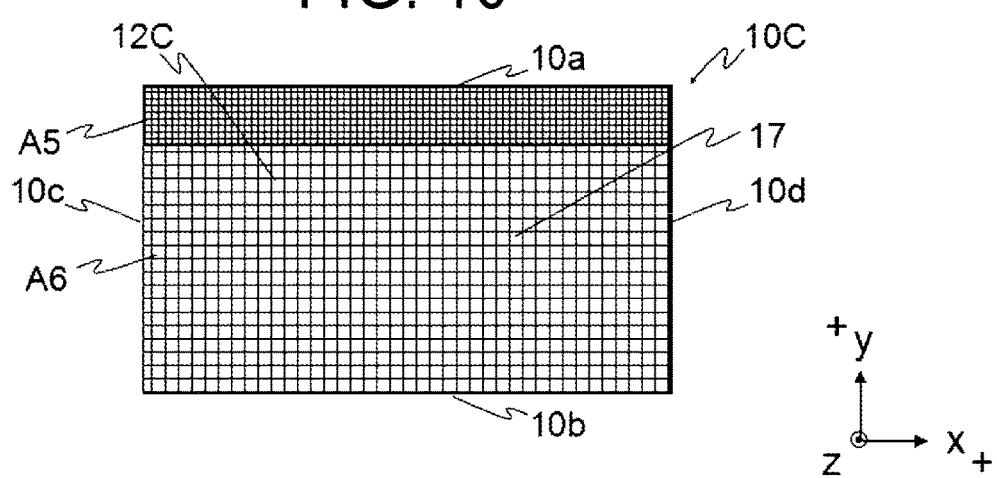
FIG. 11 is a diagram illustrating the rib formed on a reverse surface of a screen according to an embodiment of a modified example where a size of the lattice formed in a region A5, which includes a portion where a top bar 41 of the screen is provided, is smaller than a size of the lattice formed in a region A6, which is a region other than the region A5.

Furthermore, FIG. 11 is a form where a size of the lattice formed in a region A5 that includes a portion where the top bar 41 of a screen 10C is included is made smaller than a size of the lattice formed in a region A6, which is a region other than the region A5. The region A6 is a region including the central portion of the screen 10A and the sides 10b, 10c, and 10d.

Note that the average interval Sm between the irregularities in the region A3 and the region A5 can be made smaller than the average interval Sm between the irregularities in the region A4 and the region A6.

In the screens 10, 10A, 10B, and 10C, the irregularities are formed by coating the ink in a lattice (the rib 17 forms the lattice pattern), but a method of forming the irregularities by coating the ink is not limited thereto. As long as the ink is coated to draw a pattern including a plurality of intersecting lines, the pattern formed by the rib 17 may be a lattice pattern, a slanted lattice pattern, a honeycomb pattern, a checkered patter, or a radial pattern. That is, the pattern formed by printing is not particularly limited as long as it is a pattern not made by uniform printing, such as a solid coat. Moreover, the ink may be coated to draw a pattern including a plurality of parallel lines.

Furthermore, the lines formed by coating the ink are not limited to being straight lines and may be wavy lines or curved lines. Moreover, the lines are not limited to continuous lines and may be dashed lines or one-dot-dash lines. Moreover, a thickness of the line may be constant or not constant. For example, the thickness may be changed according to the line, or the thickness of one line may be changed.

However, if coating the ink to draw not the pattern including the plurality of intersecting lines but the pattern including the plurality of parallel lines, from a viewpoint of blocking prevention, wavy lines in a direction orthogonal to a winding direction of the screen are desirable.

Embodiments of the invention have been described in detail with reference to the drawings; however, specific configurations are not limited to the embodiments, and changes in the design or the like are also included in a range which does not depart from the gist of the invention. For example, the above examples have been explained in detail in order to facilitate understanding of the present invention and are not necessarily limited to examples provided with the entirety of the configuration described above.

In addition, it is possible to replace a part of the configuration of a certain embodiment with the configuration of another embodiment and it is also possible to add the configuration of another embodiment to the configuration of a certain embodiment.

Furthermore, in one or more embodiments of the present invention, "substantially/about" is a concept that includes not only when being strictly identical but also an error or a deformation of an extent where identity is not lost. For example, "substantially parallel" and "substantially orthogonal" are concepts that are not limited to when being strictly parallel or orthogonal and also include an error of an extent where identity is not lost, for example, of a few degrees or a few millimeters. For example, "about 60 degrees" includes an error of about ±2 to 3 degrees from 60 degrees. Moreover, "about 258 mm" includes an error of about ±2 to 3 mm from 258 mm.

Embodiments of Invention Disclosed in Present Specification

As grasped from the description of the embodiment of the invention detailed above, the present specification includes a disclosure of various technical ideas, including at least the inventions given below.

A reflective screen according to one or more embodiments of the present invention is, for example, a reflective screen of a sheet shape provided with a first surface formed with a plurality of inclined portions that reflects to the front a obliquely-incident projection light, wherein a thickness t1 of a portion other than the inclined portion is no more than 2 times a thickness t2 of the inclined portion.

According to this reflective screen, the thickness t1 of the portion other than the plurality of inclined portions that reflects to the front the obliquely-incident projection light is no more than 2 times the thickness t2 of the inclined portion. By this, a screen with a high flatness can be obtained.

Furthermore, the reflective screen according to one or more embodiments of the present invention is, for example, a reflective screen of a sheet shape provided with a first surface formed with a plurality of inclined portions that reflects to the front a obliquely-incident projection light, wherein a width of the reflective screen is about 1550 mm, a height of the reflective screen is about 900 mm, and when the reflective screen is suspended so a vertically-downward pulling load is about 3 kg, in a first region that includes a central portion of the reflective screen but does not include an end portion of the reflective screen, no shift arises in an image displayed on the reflective screen between when a reference line passing through a substantially central portion of the reflective screen at an incidence angle of about 15 degrees is projected to the first surface and when the reference line is projected to the first surface at an incidence angle of about 63 degrees.

According to this reflective screen, the width is about 1500 mm, the height is about 900 mm, and when the reflective screen is suspended so the vertically-downward pulling load is about 3 kg, in the first region that includes the central portion of the reflective screen but does not include the end portion of the reflective screen, no shift arises in the image displayed on the reflective screen between when the reference line that passes through the substantially central portion of the reflective screen at the incidence angle of about 15 degrees is projected to the first surface and when the reference line is projected to the first surface at the incidence angle of about 63 degrees. By this, a screen with a high flatness can be obtained.

Here, the thickness t1 may be no more than the thickness t2. By this, a screen with a higher flatness can be obtained.

Here, irregularities may be formed over an entirety of a second surface that is a surface on an opposite side of the first surface. By this, blocking is prevented where when the screen is wound a projection surface and a reverse surface of the screen adhere and do not separate.

Here, the irregularities may be formed over the entirety of the second surface by applying a surface treatment to the entirety of the second surface so a surface roughness Ra is no less than about 0.10 and a surface glossiness when an incidence angle is 60 degrees is no greater than about 20%. By this, blocking can be prevented without increasing a number of manufacturing steps.

Here, among the irregularities, the irregularities formed in the central portion of the reflective screen and a second region that includes two opposing sides may be coarser grained than irregularities formed in a third region, which is a region other than the second region of the reflective screen. By this, local distortion of the screen can be prevented.

Here, the irregularities may be formed over the entirety of the second surface by coating an ink to draw a pattern including a plurality of lines. By this, blocking is prevented where when the screen is wound the projection surface and the reverse surface of the screen adhere and do not separate. Moreover, the flatness can be increased further by adding only a little more hardness to the screen.

Here, among the plurality of lines, an interval of lines formed in the central portion of the reflective screen and a second region including two opposing sides may be made wider than an interval of lines formed in a third region, which is a region other than the second region of the reflective screen. By this, local distortion of the screen can be prevented.

REFERENCE SIGNS LIST

1 Reflective screen
10, 10A, 10B, 10C Screen
10a, 10b Side
11 Projection surface
12, 12A Reverse surface
13 Projection-side inclined surface
14 Non-projection-side inclined surface
15 White resin layer
16 Screen reference plane
17, 17a, 17b Rib
20 Skirt
30 Base
40 Pole
41 Top bar
50 Test screen
51 Screen
52, 53 Rod member
54 Stand
55 White plate
61 Test piece
62 Horizontal base
63 Plate
100 Reflective screen
110 Long-focus projector
120 Short-focus projector

The invention claimed is:

1. A reflective screen of a sheet shape, comprising:
a first surface formed with a plurality of inclined portions that reflects, to the front, a obliquely-incident projection light; wherein
a first thickness of a portion other than the inclined portion is no more than 2 times a second thickness of the inclined portion, and
a loop-stiffness value of the reflective screen is no greater than 369 mN, where the loop-stiffness value is an indicator representing a size of a resistance against crushing of a piece of the reflective screen made into a loop shape, the value being defined as a load required to press the piece, which has a size of 25 mm×150 mm made into a loop-shape having a diameter of 60 mm, so as to be compressed at a speed of 3.3 mm/min until the diameter of the loop-shape is compressed into 10 mm in a compression direction.

2. The reflective screen according to claim 1, wherein the first thickness is no greater than the second thickness.

3. The reflective screen according to claim 1, wherein irregularities are formed over an entirety of a second surface that is a surface on an opposite side of the first surface.

4. The reflective screen according to claim 3, wherein the irregularities are formed over the entirety of the second surface by applying a surface treatment to the entirety of the second surface so that a surface roughness Ra is no less than about 0.10 and a surface glossiness when an incidence angle is 60 degrees is no greater than about 20%.

5. The reflective screen according to claim 1, wherein the reflective screen is made of a resin having mechanical properties of a tensile strength of about 40 Mpa and a tensile elongation of about 550%.

6. The reflective screen according to claim 1, wherein the piece of the reflective screen made into the loop shape has a thickness in a range of 300 μm to 600 μm.

7. A reflective screen of a sheet shape, comprising:
a first surface formed with a plurality of inclined portions that reflects, to the front,
a obliquely-incident projection light;
wherein a first thickness of a portion other than the inclined portion is no more than 2 times a second thickness of the inclined portion
wherein irregularities are formed over an entirety of a second surface that is a surface on an opposite side of the first surface;
wherein the irregularities are formed over the entirety of the second surface by applying a surface treatment to the entirety of the second surface so that a surface roughness Ra is no less than about 0.10 and a surface glossiness when an incidence angle is 60 degrees is no greater than about 20%; and
wherein among the irregularities, irregularities formed in the central portion of the reflective screen and a second region that includes two opposing sides are coarser grained than irregularities formed in a third region, which is a region other than the second region of the reflective screen.

8. A reflective screen of a sheet shape, comprising:
a first surface formed with a plurality of inclined portions that reflects, to the front, a obliquely-incident projection light;
wherein a first thickness of a portion other than the inclined portion is no more than 2 times a second thickness of the inclined portion;
wherein irregularities are formed over an entirety of a second surface that is a surface on an opposite side of the first surface; and
wherein the irregularities are formed over the entirety of the second surface by coating an ink to draw a pattern including a plurality of lines.

9. The reflective screen according to claim 8, wherein among the plurality of lines, an interval of lines formed in the central portion of the reflective screen and a second region including two opposing sides is made wider than an interval of lines formed in a third region, which is a region other than the second region of the reflective screen.

* * * * *